Oct. 25, 1932.  D. H. KILLEFFER ET AL  1,883,939
REFRIGERATING APPARATUS AND METHOD
Filed Dec. 23, 1930  4 Sheets-Sheet 1

Oct. 25, 1932.  D. H. KILLEFFER ET AL  1,883,939
REFRIGERATING APPARATUS AND METHOD
Filed Dec. 23, 1930    4 Sheets-Sheet 3

INVENTOR
David H. Killeffer
Charles L. Jones
BY
ATTORNEY

Patented Oct. 25, 1932

1,883,939

UNITED STATES PATENT OFFICE

DAVID H. KILLEFFER, OF YONKERS, AND CHARLES L. JONES, OF PELHAM, NEW YORK, ASSIGNORS TO DRYICE EQUIPMENT CORPORATION, OF NEW YORK, N. Y., A CORPORATION OF DELAWARE

REFRIGERATING APPARATUS AND METHOD

Application filed December 23, 1930. Serial No. 504,248.

Our present invention is related to that set forth in application Ser. No. 447,470, of which David H. Killeffer is the sole inventor, in that it concerns refrigerators of a type adapted to employ very intense refrigerants, particularly solid carbon dioxide, and to methods of and apparatus for solving special problems connected with the employment of solid carbon dioxide for commercial refrigerating purposes. The invention is particularly adapted for and is shown as embodied in a refrigerator car, storage rooms, household refrigerators or the like, particularly where the intensely cold refrigerant and gas therefrom are utilized to maintain closely regulated temperatures, usually far above the evaporation point of the refrigerant and usually near and above the freezing point of water.

Among the unique factors involved in the use of solid carbon dioxide as a refrigerant for such purposes, are the following:

Solid carbon dioxide sublimes directly to a gas, without any intermediate liquid state, at a temperature of approximately 110° F. below zero, although the temperature may vary within wide limits above and below said temperature, according to the pressure, and the percentage of air in the atmosphere that bathes the solid carbon dioxide.

The refrigerant action is two-fold, that is to say, the local heat absorbed by change of the carbon dioxide from solid to gaseous state is the major factor, the other factor being the resulting gas, which absorbs a substantial amount of heat while warming up to normal temperatures.

The carbon dioxide gas is remarkably superior to air as a heat insulator even where the conditions of temperature and moisture content are the same, and the freshly evolved gas is phenomenally superior because it is substantially free from moisture. An important factor in controlling the flow of the freshly sublimed gas for efficient functioning as a heat insulator as well as a refrigerant medium, is that the gas is very heavy, because it is cold, and also because of its great molecular weight, which is greater than that of air even when both are at the same temperature. Hence, whenever the fresh cold gas is free to do so, it will flow downward, displacing upward, air, air and gas mixture and even pure carbon dioxide gas of higher temperature, and in a gas-tight structure, such as ours, it would, after sufficient gas has been generated, supply an atmosphere within the refrigerated chamber, substantially free of air. These qualities may be used to any desired extent in the present invention by discharging all the gas into the refrigerated space; or mingling part or all of it with the air circulation; or discharging part or all of it outside of the refrigerator.

If there are any low level openings or leaks, either in a refrigerated space or in any other container in which it is held, the cold gas will drain downward by gravity through the lower openings or leaks. If said lower openings or leaks are large enough, the downflowing gas will be replaced by air or warmer gas from the exterior, and even if the lower openings or leaks are very small, there will be a suction effect which will draw in air, in case there are any high level openings or leaks. Consequently, we prefer to use a gas-tight structure so as to ensure efficiency of operation, particularly when all the gas is discharged into the refrigerated space.

It has been proposed to utilize these qualities in various ways, most of which involve locating the solid carbon dioxide at a high level in the refrigerated space where the air is warmest and where there is opportunity for gravity downflow of the gas generated by the heat thus absorbed. In some cases the gas is discharged directly into the atmosphere of the car of the refrigerated space and the heat is applied to evaporate the refrigerant by the general thermo circulation of the atmosphere in said space for the purpose and with the result that the heavy gas flowing downward gradually displaces the air upward until the atmosphere is largely carbon dioxide gas. In other cases, the thermo circulation of the gas is confined to conduits in U-relation such that the heavy cold gas flows downward in one conduit and as it warms up, rises in another conduit and is finally discharged into the refrigerated space or, in certain cases, outside of said space. Another case is that set forth in said application Ser. No. 447,470, in which gas-tight conduits are employed for thermo circulation of the gas downward from the refrigerant upward in heat exchange relation with the refrigerated space and back to the refrigerant in closed circuit, the excess gas being discharged outside of the refrigerated space for the purpose and with the result that said space may be kept entirely free from carbon dioxide gas when used in connection with products likely to be harmed; also in said application, the temperature is partly controlled by controlling a circuit of thermo circulation of the air from the top of the refrigerated space downward in intimate heat exchange relation with the refrigerant; also means whereby the excess gas may be discharged into a refrigerated space is provided so that the advantages of the gas may be available where the products are not likely to be injured thereby.

Our present invention has somewhat similar objects in view, particularly as concerns surely and certainly keeping the gas out of the refrigerated space when this is desired, and one feature contributing to this is discarding attempt at gravity thermo circulation of the gas through a conduit system, the gas in the present case being led directly from the top of a substantially gas-tight container or bunker into a simple large area chamber or conduit in the top of the car where the air is hottest and the refrigerant values of the gas may be effectively availed of, the gas warmed in said conduit being discharged through short lengths of metal pipe of rugged construction such that gas leak into the refrigerated space may be prevented with far greater certainty by construction much cheaper and simpler than where elaborate thermo circulation conduits are employed.

In such a situation, the gas not being recirculated to serve as heat transfer medium, the air in the refrigerated space is relied upon to perform this function, the warm air being drawn from a remote part of the refrigerated space which in the case of a refrigerator car is near the middle of the car and conveyed in conduits to the solid carbon dioxide container in the remote ends of the car where said air is brought into intimate heat exchange relation with large area heat absorbing surfaces of good conducting material such as metal, preferably a vertical wall of the bunker, preferably having the solid carbon dioxide maintained in conducting contact with said wall, preferably by gravity of the solid carbon dioxide against said wall, as it melts. The air being chilled by said surfaces, flows down the same, drawing in the warm air at the far end of the intake. Preferably, the lower outlet of the air chilling space is throttled to such extent as may be desired to retard the down rush of the chilled air.

It will thus be seen that in the normal preferred operation for which our apparatus is primarily designed, the gas has no thermo circulation, but is forced through heat absorbing conduits directly to the exterior of the car, while the normal thermo circulation of the air is guided and controlled from a remote region of the refrigerated space to the top of and downward along the solid carbon dioxide bunker, thereby distributing the major portion of the refrigerant value by closed circuit thermo circulation, the up leg of which comprises the entire atmosphere of the refrigerated space, while the return and down leg comprises the guided and controlled flow through the conduits, in heat transfer relation to the refrigerant.

Air, without gas, is of particular advantage as the sole medium for such circulation, particularly where relatively high, that is, above freezing temperatures, are to be preserved in the refrigerated space because both the up leg and down leg of the circulation are of the same specific gravity and the only tendency to stratification and low-level localizing of cold is due to the differences of temperature in the different parts of the circuit. Moreover, the specific heat of air is relatively small and it is more quickly chilled and warmed. Consequently, relatively larger quantities of air may be circulated at higher speed and less dangerously low temperatures than in the case of pure carbon dioxide gas, or even gas air mixtures. Even if cooled 15 to 20 degrees below freezing, air has such small specific heat and its specific gravity is so slightly decreased below that of the air of the refrigerated space, that it will quickly warm and diffuse therein without danger of freezing the products, thus avoiding a danger which frequently attends the use of heavy, cold carbon dioxide gas.

Because of the small heat carrying capacity of the air, the circulation has to be and naturally is of higher velocity in order to transfer the amount of heat required to keep down refrigerating temperature to that desired for the products to be refrigerated.

In the preferred form, this circulation is controlled by a valve at the high level intake for the warm air and the control may be by means of a thermostat located in the conduit at the intake.

While the entire system is primarily devised for the purpose of certainly and surely keeping gas out of the refrigerated space, we provide means whereby part or all of the gas may be discharged into said space, an important feature being an arrangement whereby any desired amount of the gas can be discharged into the air intake conduit to thoroughly mingle and diffuse with the air before it is returned for thermo circulation in the atmosphere of the refrigerated space. This is in marked contrast to other systems wherein carbon dioxide gas, if used, is slowly and non-turbulently released at a low level in the refrigerated space for the express purpose of displacing upward as much air as possible. There is further provision of means for releasing the air directly into the refrigerated space so that the latter function may be served if and when desired.

Other features of the invention include the provision of a structure in which the refrigerant is practically isolated and heat insulated as concerns direct heat absorption from the refrigerated chamber, combined with means permitting of free flow of atmosphere from the refrigerated space into high heat exchange relation with the refrigerant, and with means for utilizing the refrigerant value of the cold carbon dioxide gas by high level heat absorption before permitting it to escape to the exterior atmosphere. Further features are the provision of a refrigerant bunker constructed so as to maintain maximum surface contact between the refrigerant and the more or less upright heat conducting walls the outer surfaces of which are exposed to the air circulation; also to provide a unitary bunker structure that may be moved into position or removed therefrom with a minimum of cost and labor.

Other objects are the provision of a unique temperature responsive means for automatically controlling the temperature within the refrigerator, preferably through control of the atmospheric convection currents; also positioning this means so that it is protected from damage and hidden from sight so that control of the apparatus is substantially foolproof.

The above and other features of the invention including various refinements and details, will be more evident from the following description taken in connection with the accompanying drawings, in which.

In the several views like reference characters indicate similar parts.

The refrigerator is here indicated as a refrigerator car for the purposes of illustration only and consists of the bottom 1, top 2, ends 3 and 4 and sides 5 and 6 and is completely surrounded by the outer gas-tight, preferably metallic, shell 7. The bunker openings 8 are of conventional structure, there being preferably two in each end of the car. The surrounding walls of the chamber may be of some such material as balsa wood, which is light and a good heat insulator, yet comparatively strong and able to withstand much usage. The gas-tight casing 7 completely surrounds the car and the joints 10 of the same should be painted with red lead and rubber, or any other material which will make them gas-tight, particularly to carbon dioxide gas. The best practice is to weld the points where the welds can afterwards be tested for leaks but where this cannot be done, closely spaced rivets could be applied and special precaution taken in the painting of the joints with the material to ensure gas-tightness. The doors 9 are made with a very accurate fit so that they will also be gas-tight, or as nearly so as it is possible to make them.

Within the car, the flooring is protected by the covering 15, of any suitable material, and on top of this covering are slats 16, preferably several sections of them, spaced apart so that the cold atmosphere, or carbon dioxide gas when the same is used, may circulate under the load as well as through it.

In the case of the refrigerator car here shown, each half of the length of the car is served by a refrigerating system that is a substantial duplicate of the other, the refrigerant containers being in the respective ends of the car and the auxiliary circulation controlling elements extend towards and symmetrically disposed with respect to transverse center plane of the car, but it will be understood that for shorter refrigerators such as truck bodies, only one such system will be necessary; also that in such case, the bunker may be located in the forward end with the conduits extending toward service doors at the rear end.

In the present case, the bunkers are supported by a skeleton frame-work, preferably made with angle-irons and which consists of the base members 17, upright members 18 and diagonal members 19, the latter extending from a point 20 near the rear end of the members 17 to a suitable point 21 in the upright members 18, so as to prevent weakening or sagging by the latter members, this structure has a further function of supporting the bulkhead, 70, as will be explained hereinafter. The base 17 and upright 18 are riveted or fastened together at the point 22, in any suitable manner. The gussets 23 are provided for additional support.

Figures 1, 2:
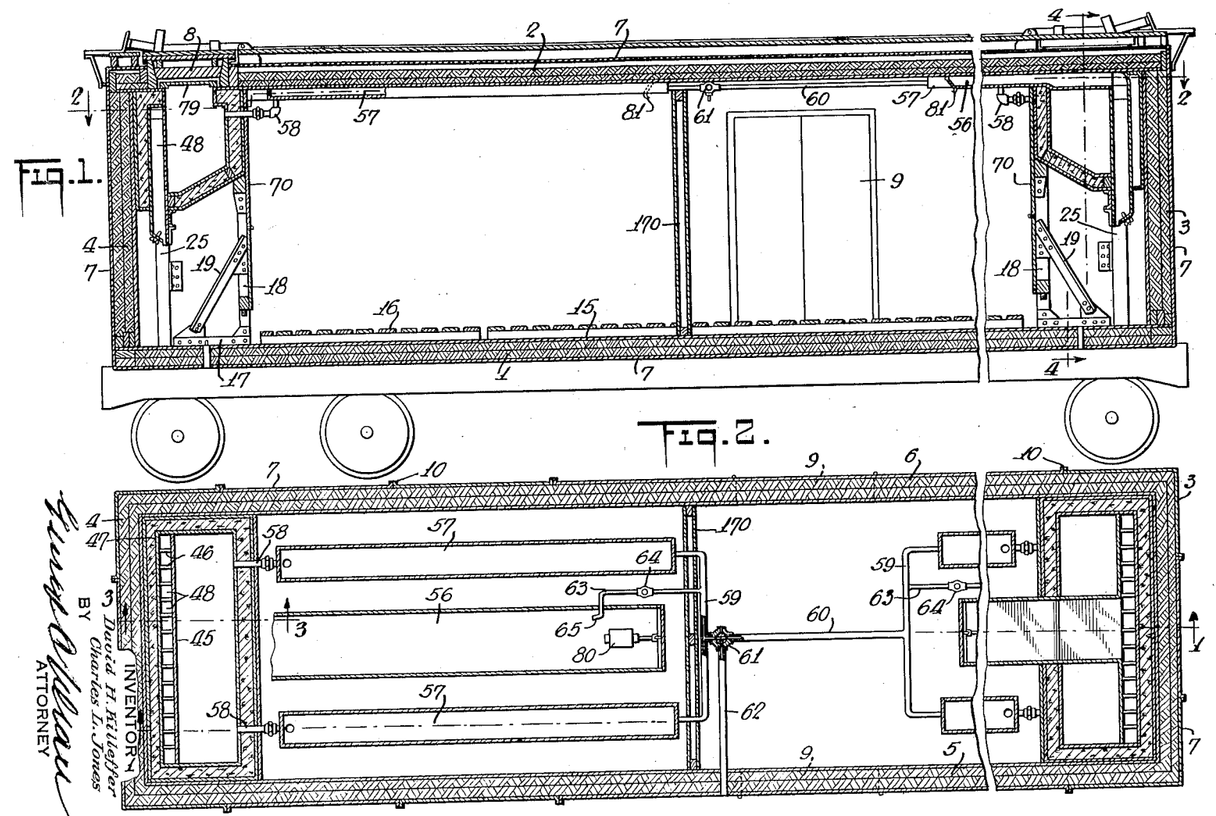
Fig. 1 represents a vertical section, taken on the irregular line 1—1 of Fig. 2.
Fig. 2 is a horizontal section, taken on the line 2—2 of Fig. 1.
Figure 3:
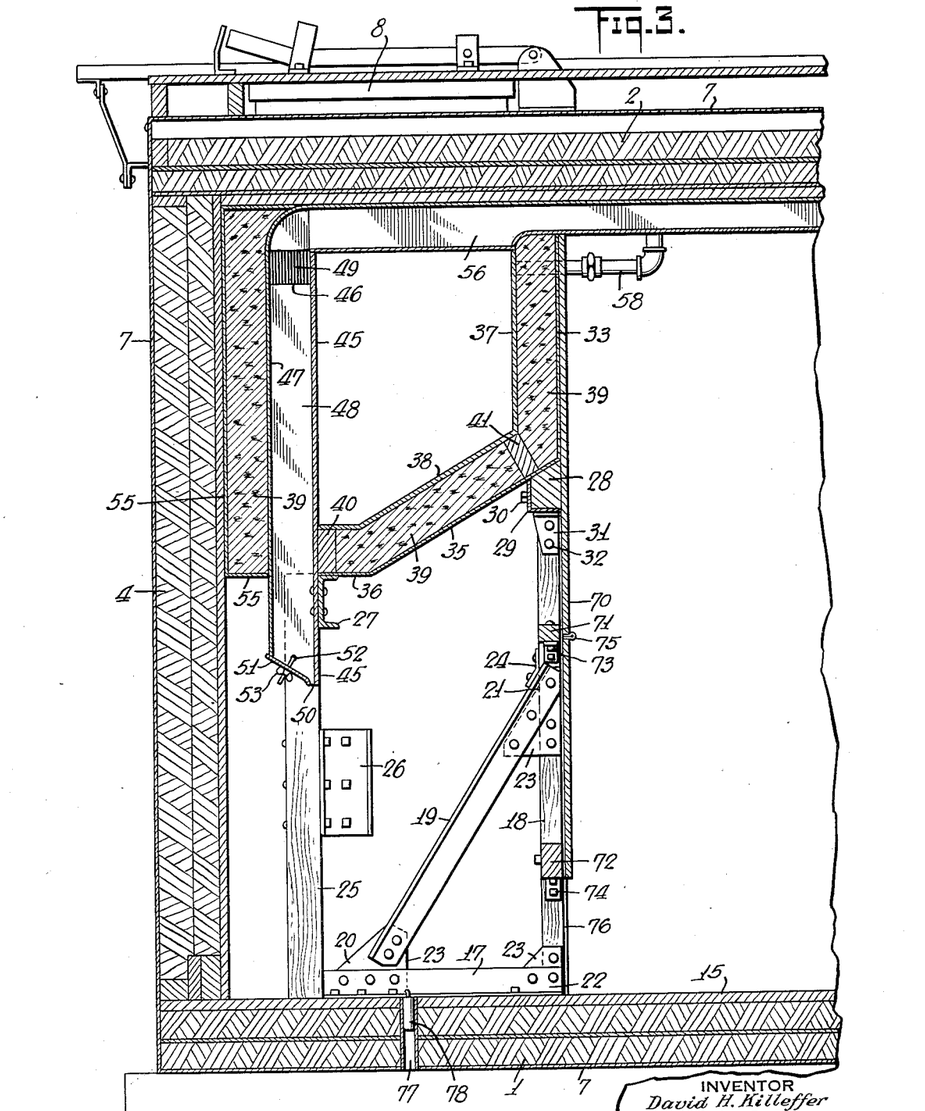
Fig. 3 is an enlargement of the bunker, taken on the line 3—3 of Fig. 2, and shows the construction of the same in detail.
Figure 4:
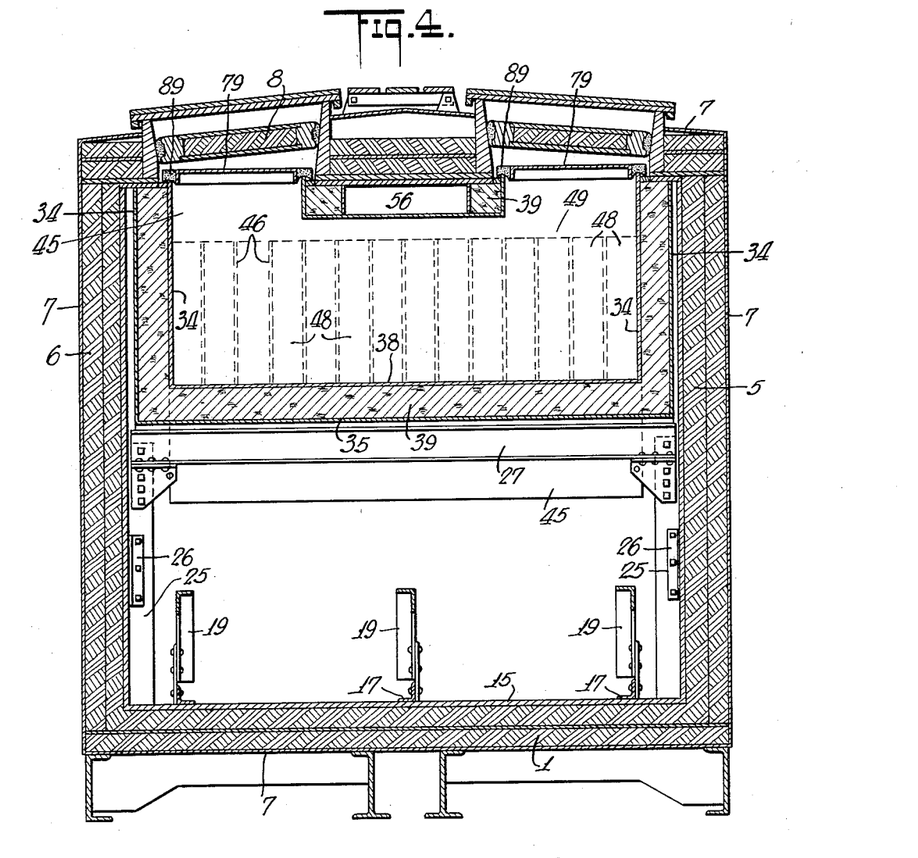
Fig. 4 is a sectional end view taken on the line 4—4 of Fig. 1.

The bunker is supported at its rear by two upright supports 25, preferably wood, which are intermediately attached to the sides, by the angle-irons 26. The support 25, at its top, is bolted to the channel cross bar 27 which extends even beyond the insulation of the bunker, as clearly shown in Fig. 4, to points adjacent the sides 5 and 6. The front end of the bunker rests on the cross member 28 which is preferably of wood, and protected by the metal angle-iron 29 which is secured to the member 28 by the bolts 30, the whole being supported by the bracket 31 which is secured, as shown at 32, to the upright member 18.

The bunker itself is composed of an outer metallic casing, consisting of the front 33, ends 34, inclined bottom 35, horizontal bottom 36 and back 55, and the inner metallic sheets 37 and 38, the latter being substantially thicker than the former. In practice it has been found very efficient to use 1/8 inch plate for the piece 37 and 1/4 inch for 38. These metallic members are preferably welded at all of their joints and have between them some good heat insulation, such as the cork 39 of about 5 inches in thickness. The wooden strips 40 and 41 extend the length of the refrigerant container and support the inner bottom to prevent the same from collapsing the insulation 39 due to the weight of the refrigerant.

At the rear of the refrigerant container is the heavy metallic sheet 45, of the same thickness as 38, extending across the entire length of the container and having at its rear and preferably made integral therewith, the heat radiator fins 46, also of the same heavy or thick metal. These fins, with the walls 45 and 47 form a plurality of vertically disposed passages 48, having at their upper ends a sort of manifold 49 and at their lower ends the restricted opening 50 formed by the plate 51 which is held in place at suitable points throughout its length by the bolts 52 and thumbscrews 53.

Behind the wall 47 is the necessary thickness of insulation 39, protected by the metal casing 55.

Leading into the passages 48 is the air duct 56 which extends from the manifold 49 over the top of the bunker and between the hatchways, along the roof of the car, to any convenient point near the center thereof. At the inlet end of 56 is the automatic control means 80, which will be described later.

On either side of the air duct 56 are the carbon dioxide gas ducts 57 connected by the pipes 58, preferably having therein unions to facilitate connection with the refrigerant chamber. The ducts 57 also extend to a point near the center of the car, their ends being in communication through the pipe 59 and this pipe being connected through the pipe 60, when two units are in use, with a similar pipe of the other unit. At some point in the pipe 60, preferably not opposite the door opening, may be placed a suitable valve 61 to allow for passage of gas from one unit to the other or to permit of the escape of the gas from one or both units to the atmosphere through the outlet conduit 62 or to discharge the gas from both units into the refrigerated chamber or to permit the gas to escape from one unit to the atmosphere and discharge the gas from the other unit into the refrigerated chamber, as desired.

Leading from the pipe 59 is the pipe 63, having at some point in its length the valve 64, which preferably enters the conduit 56 through the side thereof and, if desirable, terminates in the nozzle or restricted opening 65, or there may be a valve at 65, the handle of which extends outside the conduit 56. The utility of this pipe will be explained hereafter.

The refrigerant container has the cover 79, which, preferably, is heavy enough so that its own weight will cause a substantially airtight seal through pressure on the gasket 89, which may be of suitable soft material, as, for instance, sponge rubber.

The operation of the apparatus, as described thus far is as follows:

The bunker having been charged with solid carbon dioxide and the top 79 replaced thereon, the cold carbon dioxide gas first fills the refrigerant container, thus maintaining the refrigerant in the unusually good heat insulating atmosphere of its own gas, and flows through the pipe 58 to the large area heat absorbing ducts 57. The pipe 58 is preferably welded to the inside, 37, of the refrigerant container to preclude any possibility of escape of gas other than into the ducts 57. These ducts being of any desirable dimensions, say 3 inches by 12 inches, occupy comparatively little lading space and being positioned against the ceiling are only remotely subject to damage from the refrigerated load or when loading and unloading the same, yet they are adequate for applying most of the refrigerant value of the gas, by absorbing heat from the warmest part of the refrigerated chamber. It is well known that carbon dioxide gas is very beneficial to some products, whereas, to others it may be harmful, consequently the nature of the refrigerated products determines whether or not the gas should be discharged into the refrigerated chamber or vented to the atmosphere. This contingency may be taken care of through the valve 61. There are preferably two such ducts in communication with the refrigerant container and if they are placed near the sides 4 and 5 they will have a further tendency to maintain the desired low temperature and equalize the same, by absorbing heat entering through the sides and roof of the car. As before stated, they are comparatively free of the danger of being broken or crushed by the load, because of being relatively flat and positioned at the highest point of the refrigerated chamber, the load rarely, if ever reaching this point. The important point is that this simple, rugged conduit arrangement may be relied upon to keep the gas from possibility of leaking into the refrigerated space, unless or until this is desired and the valves are intentionally set for such operation.

The warm atmosphere from the refrigerator chamber, is carried, through the duct 56, from what is normally the warmest part of the car, i. e., near the center and roof, back over the refrigerant container, into the manifold 49 and down through the channels 48. These channels are preferably about 5 inches square, their sides being maintained at a very low temperature by conduction of heat to the refrigerant which rests on and against the relatively thick metallic surfaces 38 and 45. The wall 47 is not as thick as the wall 45 and the fins 46 because metal will conduct heat in proportion to its thickness and the wall 47 being adjacent the end of the car would have a tendency to maintain the insulation 39, at this point, and the end wall 55 at a much lower temperature than would be desirable, for a section so remote from the refrigerated chamber. We found it desirable to extend the fins 46 far enough to reach the wall 47, but this was for structural strength and is not necessary. They could have their edges short of contact with this wall.

If it were not for the open space or manifold 49 between the inlet end of the duct 56 and the top of the channels 48, the down draft would have a tendency to concentrate in those channels that are directly under the end of the duct 56, but this manifold offers the opportunity to the entering air to spread extensively to either side. To insure that the warm air will reach the end channels equally as well as those in the center, we have restricted the lower or outlet end of the channels to a comparatively small flow section. This may be accomplished by tapering the lower ends of the channels or in any other desired manner, but we prefer to have the cross sectional dimensions of this end the same as the remainder of the channel and to employ a throttle plate 51 of such width as may be required to limit downflow section. The total volume of atmosphere that can pass through the opening 50 being less than the volume of atmosphere entering through the duct 56, naturally tends to create a slight back pressure on the system at this point, the result being that there will be no greater tendency to downflow of the atmosphere through the channels near the duct 56 than there will be through the channels near the sides of the car. The bolts or screws 52 may be fastened at any convenient point, as to the fins 46, in any conventional manner, corresponding holes being cast or drilled in the plate and the same being held against the mouth of the channels by the thumbscrews 53. This construction permits of rapid and easy removal of the plate 51 so that the channels may be inspected or cleared of frost when the same has accumulated therein to an undesirable degree. The atmosphere having been in contact with the very cold surfaces, as above described, drops through the opening 50 and out under the bulkhead, back to the refrigerated chamber.

This set-up of thermo-circulation of the atmosphere within the refrigerated chamber, i. e., the warm air flowing through the duct 56 down through the channels 48 where its temperature is greatly reduced with the consequent increasing of its specific gravity, flowing out under the bulkhead 70 into the refrigerated space and displacing the warmer, lighter atmosphere upwardly; continues as long as the atmosphere is allowed to flow through the duct 56.

When the gas is allowed to escape into the refrigerated chamber, there may be a tendency for a heavy layer or blanket of substantially pure carbon dioxide gas to accumulate in the bottom of the chamber and build itself up to a substantial height in the chamber, in which case the great specific gravity of the gas might cause it to afford resistance, or perhaps even to completely stop the flow of air through the channels 48, somewhat as a pool of water might act. It is a well known fact that carbon dioxide gas is about 50% heavier than air, when both are at the same temperature and when the temperature of the gas is lowered this difference in weight is proportionately increased and it might happen that the weight of the atmosphere from within the refrigerated space, even though it be cooled to a very low temperature, will not be sufficiently heavy to force any appreciable downflow through the pool of carbon dioxide gas. For efficient operation, there should be complete co-mingling of the low temperature atmosphere from the channels 48 and the atmosphere within the refrigerated chamber and to insure such co-mingling, when the carbon dioxide gas is to be discharged into a refrigerator containing air or only small percentages of gas, we provide the pipe 63, communicating with 59 and having its other end discharging into the conduit 56, in the direction of the flow of atmosphere therethrough. This will ensure thorough pre-mixing and will prevent the formation of too heavy a layer of carbon dioxide gas or gas air mixture in the bottom of the chamber and will facilitate quick, uniform co-mingling of the carbon dioxide gas with the air throughout the atmosphere in the refrigerator. The proportion of the total of the gas discharged into the conduit 56 can be regulated through means of the valve 64. The pipe 63 should not enter the conduit in close enough proximity to the thermostat 80 to have any effect on the operation of the latter.

The bottom 38, of the refrigerant container preferably slopes at a comparatively sharp angle in order that the refrigerant will always and automatically be held in contact with the upwardly extending wall 45. Even when its volume has been reduced to a minimum, gravity will cause it to slide down the inclined surface 38, so that the remnant will be crowded against 45 and the latter being of relatively thick metal will be kept cold over a large area beyond and above where the refrigerant actually contacts.

The bunker is protected by the bulkhead 70, the bulkhead being supported against lateral pressure below the bunker, by the intermediate cross members 71 and 72, said cross members being supported by the angle-irons 73 and 74 which are fastened in any suitable manner to the uprights 18. The bulkhead is hinged at some convenient point 75, thus forming an upper and lower section, the lower section preferably being liftable so that access may be had to the region under the bunker, and it extends downwardly to a point short of the floor, thereby forming the opening 76 which permits the circulation above described.

The opening 77 is merely a drain pipe to allow for the drainage of water caused by melting frost or condensation from the refrigerating apparatus, or water used in the cleaning of the interior of the car. This opening is normally kept closed by an elongated plug 78, which effectively maintains the air-tightness of the refrigerator, when in use.

The automatic means 80 for operating the damper 81, already referred to, is located at the inlet end of the duct 56 and positioned within the duct. If the duct is not of sufficient depth to accommodate the automatic means, its depth may be increased as shown at 82, to any required extent. The automatic means may be of any desired or conventional type, but in practice we have found the thermostatic arrangement, shown clearly in Fig. 6, to be very accurate and dependable.

Figure 6:
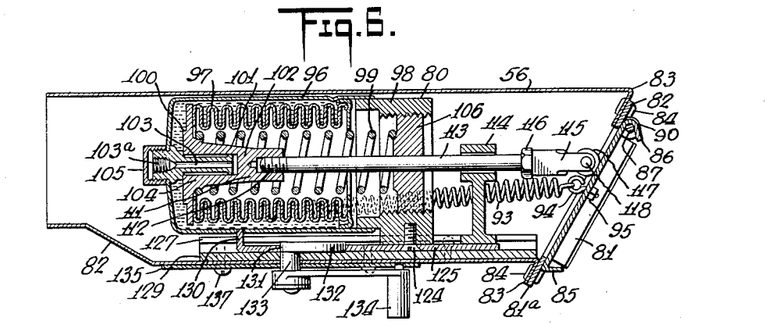
Fig. 6 is a vertical section taken on the line 6—6 of Fig. 5, showing in detail the automatic means for operating the damper.
Figure 7:
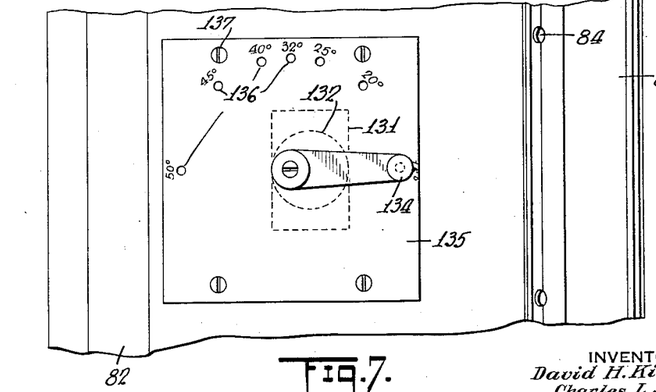
Fig. 7 is a plan view of the lower side of Fig. 5 showing the means for setting the apparatus to operate at different temperatures.

Referring to Fig. 6, the damper 81 is shown in closed position, being flush with the abutment 81a which is secured to the down turned portions 83 of the duct 56 by the rivets 84. The damper has all four of its sides bent as shown at 85 for the purpose of strengthening it, the upper bent side, 86, hooks over the pivot rod 87 and at any convenient points in the length of the side 86, ears 88 are cut from it and arranged to substantially encircle the pivot rod 87, thus forming bearing surfaces so that the damper may pivot smoothly and easily on the rod 87, which is held in place by the lugs 90.

The damper 81 is normally held in closed position by the springs 93, there preferably being one spring at each end of the damper, fastened to the damper through means of the eye-bolts 94 and nuts 95, the same or any other convenient means being utilized to fasten the other end of the spring to the sides of the duct 56.

The thermostat consists of the outer casing 96 and the inner metallic bellows 97 which is soldered or fastened to the casing 96 in any suitable manner. The spring 99, within the bellows, maintains it in extended position through pressure on the end piece 100, said end piece having the inward extension 101 which is made hollow except for the stop 102 and has the loosely fitting guide rod 103 positioned in the portion 104 for the purpose of preventing the bellows 97 from wobbling. The guide rod 103 is fastened to the casing by screw cap 105 or other means holding the flange firmly against the end of casing 96. This guide rod is hollow to permit of the space between the casing 96 and bellows 97 being filled with the preferred liquid, the opening in the rod 103 is then closed by the screw plug 103a.

The forward end 111, of the extension 101 is threaded as shown at 112 for the purpose of receiving the push rod 113. The guide, 114, through which the rod 113 slides may be placed at any convenient point to maintain the thrust of the rod in a straight line. Screwed to the end of the rod, nearest the damper, is the fork or yoke 115 which is locked in position by the nut 116 and between the prongs of the fork is held a roller 117 which revolves on the pin 118.

The casing 96 is attached to the base-plate 98 by brazing or otherwise, and the latter is internally threaded to receive the screw-plug 106, which is for adjusting thrust of the spring 99.

As the temperature of the liquid in the space between the bellows 97 and the outer casing 96 increases, there will be a corresponding increase of its vapor pressure, and this increase in pressure acting on the head piece 100 and the corrugations of the bellows force the head forward, against the thrust of the spring 99, thereby forcing the roller 117 against the damper 81, through the push rod 113, thereby opening the damper. The damper is held open a distance varying with the vapor pressure until a lower temperature permits of a decrease in vapor pressure within the casing 96, which will allow of the recession of push rod 113, acting under the tension of the spring 99.

This structure, as so far described, would permit of operation within a very limited temperature range so we have provided an adjustable means, whereby through the forward or backward movement of the thermostatic structure, in its entirety, automatic operation may be had over an extremely wide temperature range.

Figure 5:
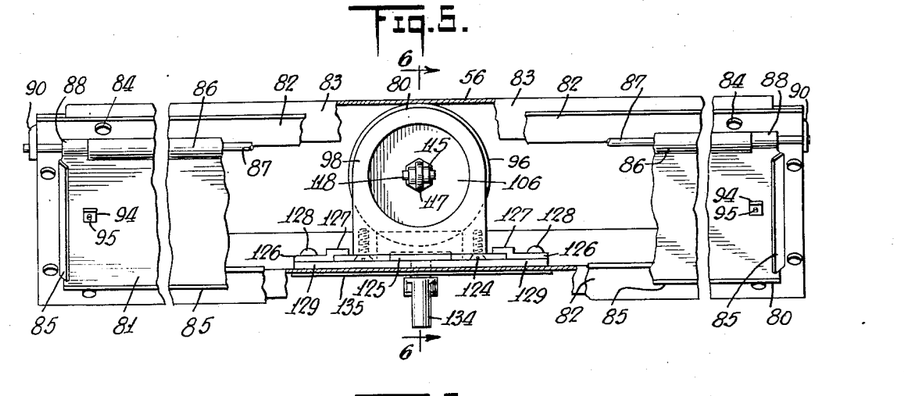
Fig. 5 is an end view, partly in section, of the damper which controls the inlet of warm atmosphere and the automatic means for controlling the same.

Referring to Fig. 6 and Fig. 5, the baseplate 98 is attached by means of screws 124, to the plate 125, said plate being arranged for forward and backward movement. On either side of the plate and extending sufficiently beyond its ends to maintain it steady, in its forward or backward movement, are the guide strips 126 which overlap the plate 125 as shown at 127, these guide strips being held by screws or rivets 128 to the reinforcing plate 129, said screws or rivets extending through both plates and the bottom of the duct 56 thereby holding the three elements together. The rear end of the plate 125 is bent upwardly as shown at 130 and cut out to form a cradle in which the rear end of the casing 96 may rest, thus preventing the rear end from moving downward when pressure is applied through the spring 93 on the forward end of the push rod 113. Forwardly of this up-turned portion is a transverse slot 131, in the plate 125 in which is positioned an eccentric 132, the eccentric being operated through the shaft 133 by the handle 134. On the underside of the duct is the plate 135, having on its face the temperature graduations 136, this plate is fastened by the screws 137, which pass through the lower side of the duct and the plate 129 and guides 126.

The above construction provides means whereby the thermostat may be moved either toward or away from the damper 81. If, for instance, the thermostat is set to operate at 15° F. and it is desired to change it to operate, say at 32° F., this can be accomplished by turning the handle 134, to the point marked 32°, the turning of the handle moving the eccentric 132 in a direction to cause rearward movement of a thermostat, the result being, of course, that the push rod 113 will have to travel a greater distance than it would when set to operate at 15° and this would be accomplished by an increase in pressure within the casing 96 due to the higher temperature to which the casing would be exposed. This higher temperature would be supplied by the atmosphere within the refrigerated space, because the said atmosphere would be increasing in temperature due to the lack of circulation through the system, which circulation would be prevented as the damper 81 has been partially or wholly closed for a longer period of time than it would have been when set to operate at 15°. This cycle would be reversed if a lower temperature were desired, the thermostat being moved closer to the damper and the push rod 113 having a shorter distance to travel.

Thus the thermostat, operating automatically at any desired temperature, will open the damper when the maximum temperature has been reached at the point at which the thermostat is located, permitting the warm atmosphere to enter the duct 56 and to flow back over the refrigerant container and down through the extremely cold channels 48, where it is rapidly cooled and becomes heavier, so that it flows downward more rapidly, thereby producing the suction that draws the warm atmosphere into the duct 56 proportionally to the difference in weight between the interior and exterior columns of atmosphere. The rapidly falling cold atmosphere, from the opening 50 would flow downward into the refrigerated space through the opening 76, with comparatively great force, thus reaching substantially all parts of the refrigerated chamber.

It should be understood that we do not limit ourselves to the specific structure, or arrangement as here disclosed. For instance, it is often expedient to construct the bunker so that its breadth is comparatively small and its depth comparatively great, this construction makes the channels 48 much longer, consequently keeping the flowing atmosphere in contact, with its extremely cold surfaces, for a longer distance than would be the case when the channels are shorter. It also permits of moving the bulkhead closer to the end of the refrigerated chamber, thereby allowing more lading or paying space within the refrigerator.

Another very useful and practical addition or modification that may be made is the provision of a temporary or permanent partition 170, extending across the chamber, thereby making two separate sections, one section to be maintained at one temperature and the other at a different temperature; or one to have gas in its atmosphere while the other has all gas discharged outside. A light wooden frame supporting cardboard or heavy paper could be put in place at a very reasonable cost and very quickly, the same being so cheap could be thrown away at the end of a journey. Such a partition and the joints could be painted with a material which is highly impermeable to carbon dioxide gas, thus when it is desired to maintain a carbon dioxide gas atmosphere in one portion of the refrigerator and maintain the other portion substantially free of carbon dioxide gas, this result can be accomplished by the simple expedient explained above.

If the two units are to operate at the same temperature, one thermostat will suffice, but if it is desired to operate them at different temperatures, a thermostat for each unit should be provided.

Our invention is particularly adaptable for large refrigerators, but it is applicable to ordinary household refrigerators, when constructed on a smaller scale. Either one or two units may be employed, and if desirable, where two units are used, one may be independent of the other, if it is so desired.

We claim:

1. A refrigerator and refrigerating system therein, including a receptacle for solid carbon dioxide; means to minimize heat transfer from the refrigerated space into said receptacle, including insulation for the receptacle and means for control of the evaporated gas and means for substantially causing such transfer by thermo circulation of the atmosphere of the refrigerated space, said means including a downflow portion serially connecting high and low levels of said atmosphere and having an intermediate portion only, of said means, extending in close heat exchange relation with a highly conducting surface kept cold by said refrigerant, the heat exchange portion of the downflow portion being of great width and of greater flow section than the outlet thereof.

2. A refrigerator and a refrigerating system, including a substantially gas-tight receptacle for solid carbon dioxide, very highly insulated against direct heat conduction from the refrigerated space, and a non-return conduit through which the gas evaporated from the solid may be discharged outside of said space whereby heat transfer from and evaporation of the solid by direct heat transfer from said space is below normal requirements and gas may be kept out of the atmosphere of the refrigerated space, in combination with means for variably transferring heat from the refrigerated space to the receptacle, said means including a downflow portion serially connecting high and low levels of the atmosphere of the refrigerated space and extending in close heat exchange relation with said refrigerant receptacle.

3. A refrigerator and a refrigerating system, including a substantially gas-tight receptacle for solid carbon dioxide, very highly insulated against direct heat conduction from the refrigerated space, and a non-return conduit through which the gas evaporated from the solid may be discharged outside of said space whereby heat transfer from and evaporation of the solid by direct heat transfer from said space is below normal requirements and gas may be kept out of the atmosphere of the refrigerated space, in combination with means for variably transferring heat from the refrigerated space to the receptacle, said means including a downflow portion serially connecting high and low levels of the atmosphere of the refrigerated space and extending in close heat exchange relation with said refrigerant receptacle, the intake of said downflow portion being from a region of the refrigerated space remote from said receptacle.

4. A refrigerator and a refrigerating system, including a substantially gas-tight receptacle for solid carbon dioxide, very highly insulated against direct heat conduction from the refrigerated space, and a non-return conduit through which the gas evaporated from the solid may be discharged outside of said space whereby heat transfer from and evaporation of the solid by direct heat transfer from said space is below normal requirements and gas may be kept out of the atmosphere of the refrigerated space, in combination with means for variably transferring heat from the refrigerated space to the receptacle, said means including a downflow portion serially connecting high and low levels of the atmosphere of the refrigerated space and extending in close heat exchange relation with said refrigerant receptacle and thermostatic means controlling the intake of said portion.

5. A refrigerator and a refrigerating system, including a substantially gas-tight receptacle for solid carbon dioxide, very highly insulated against direct heat conduction from the refrigerated space, and a non-return conduit through which the gas evaporated from the solid may be discharged outside of said space whereby heat transfer from and evaporation of the solid by direct heat transfer from said space is below normal requirements and gas may be kept out of the atmosphere of the refrigerated space, in combination with means for variably transferring heat from the refrigerated space to the receptacle, said means including a downflow portion serially connecting high and low levels of the atmosphere of the refrigerated space and extending in close heat exchange relation with said refrigerant receptacle, and means for retarding the velocity of the downflow to maintain a body of the air in heat exchange relation with the wall of the receptacle for a relatively long time.

6. A refrigerator and a refrigerating system, including a substantially gas-tight receptacle for solid carbon dioxide, very highly insulated against direct heat conduction from the refrigerated space, and a non-return conduit through which the gas evaporated from the solid may be discharged outside of said space whereby heat transfer from and evaporation of the solid by direct heat transfer from said space is below normal requirements and gas may be kept out of the atmosphere of the refrigerated space, in combination with means for variably transferring heat from the refrigerated space to the receptacle, said means including a downflow portion serially connecting high and low levels of the atmosphere of the refrigerated space and extending in close heat exchange relation with said refrigerant receptacle, the heat exchange portion of the downflow portion being of great width as compared with the inlet and of great flow section as compared with the outlet.

7. A refrigerator and a refrigerating system, including a substantially gas-tight receptacle for solid carbon dioxide, very highly insulated against direct heat conduction from the refrigerated space, and a non-return conduit through which the gas evaporated from the solid is conducted outward in heat exchange relation with a high level portion of the refrigerated space and thence through an outlet outside of said space whereby heat transfer and evaporation of the solid by direct heat transfer from said space is below normal requirements, and gas may be kept out of the atmosphere of the refrigerated space, in combination with means for variably transferring heat from the air of the refrigerated space to said receptacle, including a downflow portion serially connecting high and low levels of the refrigerated space and extending downward in heat exchange relation with an uninsulated outer surface of said receptacle, the intake of said downflow portion being from a region of the refrigerated space remote from said receptacle, thermostatic means controlling the intake of said portion and means for retarding the velocity of the downflow to maintain a body of the air in heat exchange relation with the wall of the container for a relatively long time.

8. A refrigerator and a refrigerating system therein, including a substantially gas-tight metal receptacle for solid carbon dioxide, very highly insulated against heat but having one wall exposed, in combination with means for transferring heat to said wall by convection from the refrigerated space, including a downflow conduit extending downward in heat exchange relation with said exposed wall of said receptacle, the heat exchange portion of the downflow conduit being of great width as compared with the inlet and of great flow section as compared with the outlet and being located outside of said refrigerated space.

9. A refrigerator having therein a refrigerating apparatus comprising an insulated solid carbon dioxide container, a conduit for circulating atmosphere having its intake in a remote portion of the refrigerated chamber and extending in heat exchange relation to said refrigerant container; and a carbon dioxide gas outlet conduit leading from said refrigerant container to remote portions of said refrigerated chamber, and means whereby gas from outlet conduit may be discharged into the intake of the first mentioned conduit.

10. A refrigerator having therein a refrigerating apparatus comprising an insulated solid carbon dioxide container, a conduit for circulating atmosphere having its intake in a remote portion of the refrigerated chamber and extending in heat exchange relation to said refrigerant container; and a carbon dioxide gas outlet conduit leading from said refrigerant container to remote portions of said refrigerated chamber, and means whereby gas from outlet conduit may be discharged inside or outside said refrigerated chamber.

11. A method of controlling distribution of refrigerating effects of solid carbon dioxide, which includes highly insulating solid carbon dioxide from direct heat absorption from the refrigerated space; and conducting all of the gas from said solid into heat exchange relation with the refrigerated space and discharging all of it outside of said space; and applying heat to said solid carbon dioxide through a metallic conductor which is located outside of said refrigerated space by thermo circulation of air of the refrigerated space in heat exchange relation to said conductor, thereby making the rate of sublimation of gas dependent mainly on the temperature of the air of said refrigerated space.

12. A method of controlling distribution of refrigerating effects of solid carbon dioxide, which includes highly insulating solid carbon dioxide from direct heat absorption from the refrigerated space; and conducting all of the gas from said solid into heat exchange relation with the refrigerated space and discharging all of it outside of said space; and applying heat to said solid carbon dioxide through a metallic conductor which is located outside of said refrigerated space by thermo circulation of air of the refrigerated space in heat exchange relation to said conductor, thereby making the rate of sublimation of gas dependent mainly on the temperature of the air of said refrigerated space, and regulating said temperature by regulating the rate of flow of said air.

13. A method of controlling distribution of refrigerant effects of solid carbon dioxide, which includes highly insulating solid carbon dioxide from direct heat absorption from the refrigerated space; and conducting all of the gas from said solid into heat exchange relation with the refrigerated space and discharging all of it outside of said space; and applying heat to said solid carbon dioxide through a metallic conductor which is located outside of said refrigerated space by thermo circulation of air of the refrigerated space in heat exchange relation to said conductor, thereby making the rate of sublimation of gas dependent mainly on the temperature of the air of said refrigerated space, and regulating said temperature by regulating the rate of flow of said air by and in accordance with the temperature of the air flowing toward said conductor.

14. A method of controlling distribution of refrigerant effects of solid carbon dioxide, which includes applying heat to said solid carbon dioxide through a metallic conductor by thermo circulation of atmosphere from the refrigerated space, the down leg of said circulation being confined and guided in heat exchange relation with said conductor; and controlling discharge of carbon dioxide gas evaporating from said solid, so as to maintain a substantially homogeneous atmosphere throughout said thermo circuit.

Signed, at New York, in the county of New York and State of New York, this 22nd day of December, A. D. 1930.

DAVID H. KILLEFFER.
CHARLES L. JONES.